United States Patent [19]

Surwill

[11] 3,734,481
[45] May 22, 1973

[54] ADJUSTABLE WEDGE ASSEMBLY
[75] Inventor: Michael Surwill, Burbank, Calif.
[73] Assignee: Lockheed Aircraft Corporation, Burbank, Calif.
[22] Filed: Nov. 16, 1970
[21] Appl. No.: 89,844

[52] U.S. Cl. ............................. 269/228, 269/234
[51] Int. Cl. ........................................... B25b 1/14
[58] Field of Search .................. 269/58, 59, 76, 228, 269/234, 310, 321 A, 309, 321 UE

[56] References Cited
UNITED STATES PATENTS

| | | | |
|---|---|---|---|
| 2,039,843 | 5/1936 | Howland-Shearman | 269/234 X |
| 378,572 | 2/1888 | Carroll | 269/59 |
| 2,675,609 | 4/1954 | Miller | 269/76 |
| 1,404,275 | 1/1922 | Cowles | 269/234 X |
| 2,424,090 | 7/1947 | Gordinier | 269/310 |
| R23,732 | 11/1953 | Cleveland | 269/310 |
| 570,466 | 11/1896 | Dutro | 269/234 X |
| 1,045,984 | 12/1912 | King | 269/234 X |
| 2,696,764 | 12/1954 | Sternbergh | 269/310 |
| 1,335,247 | 3/1920 | Lask | 269/310 |
| 3,139,177 | 6/1964 | Allemann | 269/58 X |
| 3,537,701 | 11/1970 | Claycomb | 269/309 |
| 3,559,980 | 2/1971 | Terai | 269/309 X |

*Primary Examiner*—Granville Y. Custer, Jr.
*Attorney*—Frank L. Zugelter and George C. Sullivan

[57] ABSTRACT

A wedge assembly adjustable from a remote position from the wedge, for supporting forgings undergoing machining on a worktable or for other purposes. A riser member slidably mounted in a body member is supported by a wedge seated on the body member and disposed in a slot in the riser. The wedge is longitudinally displaceable through the slot by a push-pull rod whose one end is connected thereto. At the other end of the rod, remote from the riser, a toggle arrangement for axially displacing the rod and a stem-and-handle means for locking the rod at a particular displacement is provided. The body member supporting the wedge and riser is securable to the worktable under a portion of the forging or other workpiece desired to be held during machining or during other operations on a workpiece. The load of the forging or workpiece passes directly through riser, wedge and body member to the worktable, while the remotely positioned stem-and-handle and toggle arrangement facilitate the proper positioning for the wedge prior to work on the workpiece. Proper elevation of the riser member to contact the forging avoids excessive lifting of the forging or workpiece. The problem of excessive lifting exists with use of conventional jacks, resulting in an out-of-tolerance condition upon removal of the machined element from the worktable. However, use of plurality of these assemblies avoids such problem.

15 Claims, 3 Drawing Figures

MICHAEL SURWILL
*INVENTOR.*

BY George C. Sullivan
Agent

Frank L. Zugelter
Attorney

ADJUSTABLE WEDGE ASSEMBLY

BACKGROUND OF THE INVENTION

1. Field of the Invention

The field of art to which the invention is most likely to pertain is located in a class of devices generally relating to wedges; Classes 248, Supports; 254, Pushing and Pulling Implements; and 269, Workholders, U. S. Patent Office Classifications, may be the applicable general areas of art in which the claimed subject matter of the type involved here may be classified.

2. Description of the Prior Art

Examples of prior art devices in the arts to which this invention most likely pertains are U. S. Letters Patent Nos. 1,726,260; 1,988,840; 2,147,909; 2,831,654; and 3,239,218.

PROBLEMS IN THE PRIOR ART

In the process of machining large forgings and castings, the clamping forces developed by clamping such parts to a workbed induce deflections in such a manner that when the machined part is removed from the workbed, it has not been properly machined. An "out-of-tolerance" condition develops at an unsupported portion of the workpiece as a result of the clamping forces placed on the workpiece prior to machining but after supporting jacks have been applied. Thus, many complex workpieces have had to be scrapped. In prior efforts to overcome this problem, laborious and time-consuming processes of shoring up unsupported portions of such a part, before application of strapping clamps, were carried out. Thereafter, such clamps pulled the workpiece down snug against the workbed. On the other hand, in carrying out the effort to make snug such workpiece, screwjacks and pop-up jacks were used to shore up various and many portions of the large workpiece, however, the mechanical advantage of such jacks has been too great for the purpose of providing the operator a "feel." That is, the operator could not satisfactorily determine whether an excessive lifting was occuring by use of a jack or a proper support was, in fact, established. Such a lifting went unnoticed in many cases, even with experienced operators. On the other hand, were such lifting noticed, additional set-up time with such jacks would be required to once again properly support the forging or casting prior to clamping and the subsequent machining on the workbed.

Another problem that existed prior to this invention was the inability of gaining access into areas to support a forging during a machining process. The clearance between the worktable and workpiece along the length of the forging or casting is very limited, thus, the number of such positions for access to jacks were limited. As a result, placing of the jacks was impaired, and in many instances, accurate positioning of such jacks along particular portions of the forgings and castings had been impaired, and difficult to achieve if at all.

In other words, because of the requirement of clamps to hold stationary the workpiece, a positive location for and at a given height for a jack to support the workpiece could not be satisfactorily and consistently achieved. And adjustment of a jack when positioned in a limited access area has not provided an adequate "feel" by an operator. All this has led to a machined element which was "out-of-tolerance."

These problems are overcome by the novel device disclosed and claimed herein.

SUMMARY OF THE INVENTION

An object of this invention is to provide a novel assembly of elements providing proper support of a workpiece on its worktable.

Another object of the invention is to provide elimination of a scrapped machined part which heretofore has been produced in instances as a result of excessive lifting thereon.

A further object of the invention is to provide an assembly which is efficient in operation, simple in construction, and relatively inexpensive to manufacture.

Another object of the invention is to provide a relatively small mechanical advantage in the direction of lift on a workpiece supported on a machine bed but nevertheless provide a positive contact between the supporting assembly and the workpiece whereby proper and consistent support is achieved without excessive lifting of the workpiece prior to clamping the workpiece.

A still further object of the invention is to avoid an "out-of-tolernace" condition that develops in a machined part as a result of improper support thereof during a machining process thereon.

Another object of the invention is to provide efficient positioning and location of a wedge assembly supporting a forging-to-be-machined in or out of limited access areas between the workpiece and its worktable, by remotely positioning actuating and/or locking means for the assembly.

Other objects of the invention are to provide minimum set-up time for machining of a workpiece, forging or casting, and to minimize scrapping, if any, thereof, thereby resulting in labor and cost of material savings.

Another object of the invention is to provide a positive, quick and facile adjustment of a supporting assembly, regardless of its position or location between a workpiece and its bed.

These and other objects and advantages will become more apparent upon a full and complete reading of the following description, appended claims thereto and the accompanying drawing.

DESCRIPTION OF THE PREFERRED EMBODIMENT

Figure 1:
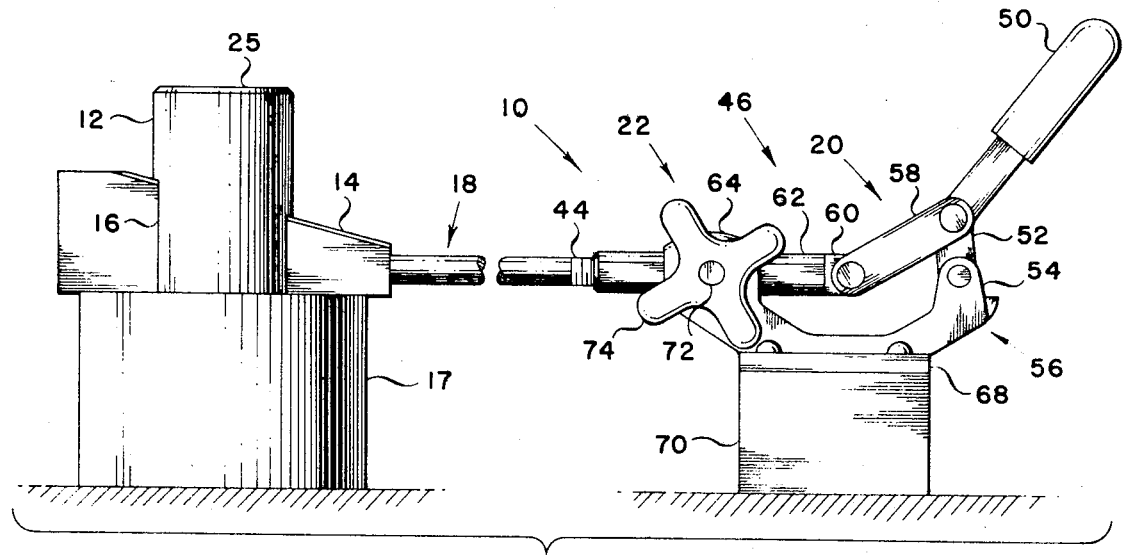
FIG. 1 is a side elevational view of a preferred embodiment of my invention.

Referring to the FIGS. in which reference characters correspond to like numerals in the following description, 10 (FIG. 1) refers to a portable adjustable wedge assembly embodying the invention. Assembly 10 comprises a head or riser member 12 adapted for lineal movement in one plane, a wedge member 14 slidably engaging a slot 16 provided in the substance of the riser member 12, a support member or body 17 supporting member 14 and restricting direction of movement of riser member 12 within such plane, actuating means 18, preferably in the form of rod, connected to the wedge member 14 at its one end, a means 20 such as a push-pull toggle arrangement provided at a remote point from the location of the riser member 12 and wedge member 14 for axially displacing means 18 within a second plane, and a means 22 such as a shaft-and-handle device for securing or locking means 18 at a particular or desired axial position.

Figure 2:
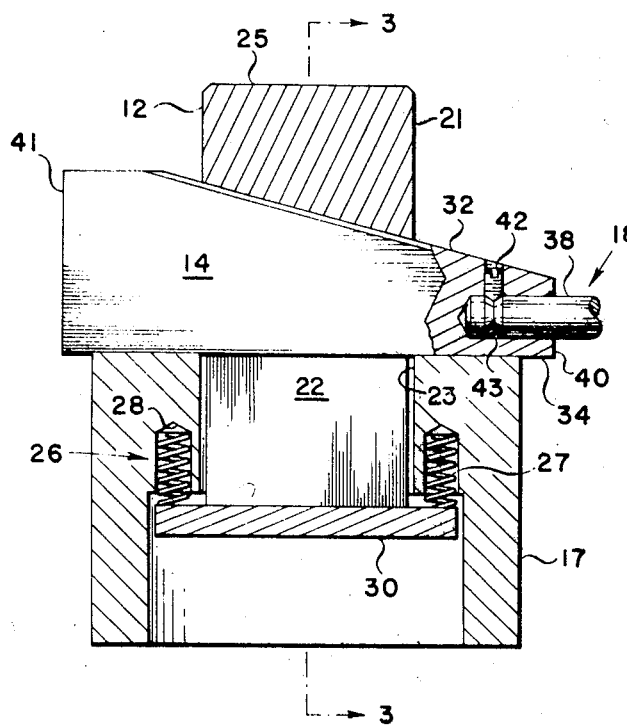
FIG. 2 is a cross-sectional view of a portion of the embodiment illustrated in FIG. 1.

The riser member 12 includes a skirt 22 retained and slidably disposed within a cavity 23 of body 17 and has a portion 21 projecting exteriorly from the cavity 23. The support member 17 is adapted for securement to a sub-base or worktable (not shown) on which a forging is disposed and subsequently securely held by clamping straps or the like (not shown) for machining purposes. It is on the top 25 of the head or riser member 12 that a portion of the forging or other workpiece sets or is supported during machining or other operation thereon. A means 26 is provided within body 17, as shown in FIG. 2, for preventing separation of riser member 12 from any longitudinal position of wedge member 14 in slot 16.

The means 26 may take the form of a plurality of coiled compression springs 27 each of which is disposed and retained in one of a corresponding number of bores 28 peripherally located at the base of a recess 29 formed in the bottom of the body 17. A plate 30 suitably secured to the bottom of riser member 12 maintains compression of such springs 27 in bores 28, whereby a constant downward pull or push on riser 12 against wedge member 14 develops and is maintained to prevent the separation of their facing surfaces or walls 31 and 32, respectively. It should be apparent, however, that assembly 10 nevertheless is operative should such a means 26 be omitted, and that only a manual resetting of riser member 12 would be necessary to lower the top 25 thereof, if it were not to drop by gravitational force alone, so that the top wall surface inclination 31 of slot 16 directly abuts against or engages an inclined wall 32 of wedge member 14 prior to introduction of assembly 10 under a portion of a forging or workpiece.

Figure 3:
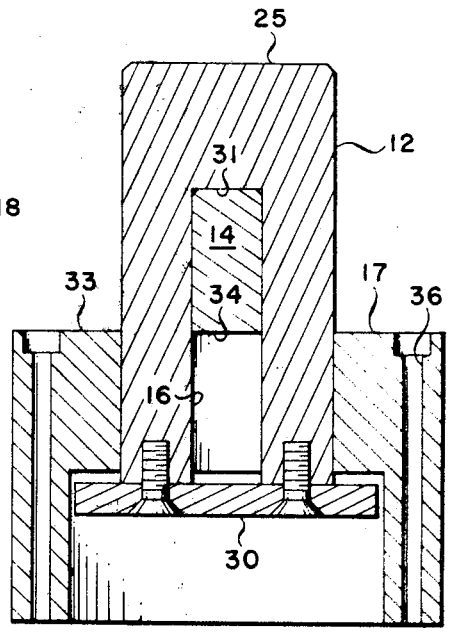
FIG. 3 is a view taken on line 3—3 of FIG. 2.

The slot 16 is cut out of the substance or material forming riser member 12, and begins at the base thereof extending, preferably diametrically, upwardly therein to a desired level which is above the top surface 33 (FIG. 3) of the body 17 but not to the extent of the riser top 25, in order to introduce wedge member 14 therethrough and still retain a solid portion extending above slot 16 to the top 25 for contact with and support for a forging. The base 34 of wedge member 14 seats upon the top surface 33 of body 17 and is preferably of greater length than its widest dimension shown in FIG. 2. Its wall or edge 32 is inclined relative to base 34. A corresponding inclination is included in the upper wall 31 of slot 16 for registry therewith. It should now be apparent that riser member 12 rises and falls with the longitudinal movement of wedge member 14 across body 17. Body 17 is securely fastened to a worktable (not shown), in the utilization of assembly 10, by suitable means such as by threaded countersunk bolts inserted through corresponding holes 36 (FIG. 3) extending therethrough.

Rod 18 is connected at its one end 38 (FIG. 2) to wedge member 14, preferably at its smaller vertical side 40 as distinguished from its higher vertical side 41. A set screw 42 threaded into member 14 registers against a corresponding groove 43 in end 38 for securing such connection. Other conventional connections may be utilized.

The means 20, 22 are provided at the remote other end 44 (FIG. 1) of the rod 18 for axially displacing and for securing or locking rod 18 at a particular axial position, respectively. Means 20 exists as a purchasable push-pull toggle article 46, Model CL-2100-PC, manufactured by the Carr Lane Manufacturing Co., 4200 Krause Court, St. Louis, Mo. 63119, and includes a lever 50 having a dogleg 52 pivoted upon a bifurcated arm 54 cast at one end of a frame 56 for the article 46 and a pair of links 58 pivotally connected at the joint of the lever 50 and its dogleg 52 and at corresponding flats 60 included on one end of a bar 62 slidably mounted in a collar 64 cast at the other end of the frame 56. At the other end of the bar 62, a threaded bore is provided for securing (threaded) rod end 44 thereto. The effect of the toggle action of the article 46; i.e., by pushing or pulling the lever 50, is to exchange the effort distance (swinging of lever 50) for a relatively high mechanical advantage desired for longitudinally moving the wedge member 14 to-and-fro across the body 17. In other words, the wedge member 14 is thrust rapidly through a smaller distance than the swinging distance of the lever 50, and a relatively greater force in moving the wedge member 14 is obtained in so doing. However, a relatively low mechanical advantage is obtained with respect to the vertical movement of the riser member 12. Thus, the "feel" by an operator in properly adjusting the height of the riser member 12 to the underside of a forging or the like on a worktable is facilitated and satisfactorily achieved. The problem of excessive lifting of a forging is avoided, or solved, by what amounts practically to an automatic sensing of the necessary contact required between the riser member 12 and the forging. With a conventional screwjack or pop-up jack, the problem of sagging along its unsupported areas or excessive lifting at the areas supported by the assembly 10, of the forging, is always present, regardless of the experience of the operator. However, this problem is overcome with assembly 10, the number thereof used, of course, depending on the complexity and size of the workpiece.

Pulling the lever 50 away from the body 17 axially displaces the rod 18 in a direction away from body 17 and thereby provides for raising of the riser 12. Moving the lever 50 toward the body 17 displaces the rod 18 in a direction toward body 17 and thereby provides for lowering the riser 12. A securing plate 68 is also cast in, respectively article 46 for securely connecting it to a suitable block 70 used as an expedient toward maintaining the rod 18 in a plane generally in alignment with the wedge member 14.

The locking means 22 may comprise any conventional device which positively prevents the rod 18 from axially displacing, such as a thumb screw device. Other suitable devices may also be utilized. The article 46 is easily modified to provide a support for a locking means 22 in any position for rod 18. A threaded shaft or stem 72 having a handle or hand wheel 74 mounted on its one end is threaded into a threaded bore of a boss (not shown) easily welded in a horizontal manner to the collar 64. Advancing the shaft 72 into the boss provides engagement of its end with the bar 62 thereby in effect locking the rod 18 in a particular axial disposition by the pressure exerted by shaft 64 against the bar 62.

Assembly of device 10 is readily apparent from the above description and the drawing. Its operation should also be apparent, however, briefly, the lever 50 is pushed toward the body 17 to reduce the height of the riser 12 in order for introduction of the assembly 10 to a position along and under a forging or the like setting on a worktable. Once in position, the lever 50 is pulled outwardly; i.e., away from the body 12, to raise the head or riser 12. A swift and quick thrust of the riser 12 occurs as the wedge member 14 longitudinally displaces in its slot 16. A positive contact by the top 25 is immediately obtained to provide a desired unyieldable plane for supporting the workpiece or the like on such plane. Thereafter, the means 22 may be applied to effectively lock and prevent further axial movement of the rod 18 and consequently, movement of the riser 12.

A 15° inclination for the wedge member 14 is preferred in connection with supporting huge and heavy aluminum forgings whose ultimate utilization is found in aircraft frames. In this particular use of the assembly 10, it is desirous to maintain the sufficiently low mechanical advantage in the plane in which the riser 12 displaces so that rapid travel over a short distance therefor occurs and hence the operator can easily and immediately tell when the riser 12 has made adequate contact with the forging. Unnecessary lifting occurs with a screwjack or pop-up jack, as initial contact with a forging doesn't provide a "feel" to an operator. Consequently, he continues to raise such jack. Clamping of the workpiece then pulls it down to the workbed, and after machining thereof, the finished product may be "out-of-tolerance." It should be apparent that either additional set-up time and/or scrapping is the effect in the event that the jack support is not proper.

The remote location of the means 20 further provides another advantage, as it facilitates operation of and reduces set-up time, whereas access to conventional jacks or the like, at the point of support of the forging, such as in limited access areas, is very difficult under many circumstances.

Furthermore, a feedback force to the means 20 is averted even with the means 22 loose. This advantage occurs as any clamping forces on the forging acts downwardly directly through the riser 12 and the body 17 to the workbed, and is not transferred to the means 20.

Assembly 10 may be formed of suitable materials, such as metal.

Pursuant to the requirements of the patent statutes, the principle of this invention has been explained and exemplified in a manner so that it can be readily practiced by those skilled in the art to which it pertains, or with which it is most nearly connected, such exemplification including what is presently considered to represent the best embodiment of the invention. However, it should be clearly understood that the above description and illustrations are not intended to unduly limit the scope of the appended claims, but that therefrom the invention may be practiced otherwise than as specifically described and exemplified herein, by those skilled in the art, and having the benefit of this disclosure.

Therefore, what I claim as patentably novel is:

1. In a portable wedge assembly, including a riser member providing an unyieldable plane of support for a workpiece or the like upon adjustment of the height of the wedge, and means for actuating the wedge to so adjust the height of the riser member,
the improvement comprising,
a support member having means defining a cavity,
said riser member having a skirt slidable within said cavity and having a portion projecting exteriorly of said support member,
said riser member defining a slot therethrough and which slot includes a surface inclination in its exteriorly projecting portion,
the wedge being disposed and retained in said slot for slidable engagement with said surface inclination,
said wedge being exteriorly slidably seated on and supported by said support member across said means defining a cavity,
said support member not extending above said wedge,
whereby sliding movement of the wedge across said support member by the actuating means causes it to adjust the height of said riser member.

2. The improvement of claim 1 including means for displacing said actuating means to a particular position whereby said riser is disposed at a desired level by longitudinal movement of said wedge corresponding to the movement of said actuating means in its displacement to such position.

3. The improvement of claim 2 including means for positively locking said actuating means and being connected to said actuating means at a distance from the wedge assembly.

4. The improvement of claim 3 in which said locking means is a supported stem-and-handle means for tightening the stem thereof against said displacing means.

5. The improvement of claim 3 in which said actuating means is a rod.

6. The improvement of claim 5 in which said locking means is a supported stem-and-handle means for tightening against said rod.

7. The improvement of claim 1 in which said actuating means is an axially-positionable rod.

8. The improvement of claim 2 in which said actuating means is an axially-positionable rod and said displacing means is a toggle arrangement connected to said rod for axially positioning same.

9. The improvement of claim 8 including means for positively locking said actuating means at a particular linear position.

10. The improvement of claim 9 in which said locking means is a stem-and-handle means thereon, the stem effectively exerting force to prevent movement of said rod.

11. The improvement of claim 1 including means for biasing said riser member against said wedge to prevent their separation regardless of the movement of said wedge across said support member.

12. The improvement of claim 11 in which said biasing means is at least one compression spring, with a recess in said support member, a plate secured to the skirt of said riser and retained within said recess, and said spring being mounted in said support member and seating against said plate.

13. The improvement of claim 1 in with said support member is a cylindrical sleeve, said riser member being slip-fitted thereto.

14. The improvement of claim 13 including means for biasing said riser member against said wedge to prevent their separation regardless of the movement of said wedge across said support member.

15. The improvement of claim 14 in which said biasing means is at least one compression spring, with a recess in said support member, a plate secured to the skirt of said riser and retained within said recess, and said spring being mounted in said support member and reacting against said plate.

* * * * *